US012626523B2

(12) United States Patent
Alvarez et al.

(10) Patent No.: US 12,626,523 B2
(45) Date of Patent: May 12, 2026

(54) PROCESSOR FOR LIFETIME-BASED UNMIXING IN FLUORESCENCE MICROSCOPY

(71) Applicant: LEICA MICROSYSTEMS CMS GMBH, Wetzlar (DE)

(72) Inventors: Luis Alvarez, Wetzlar (DE); Frank Hecht, Wetzlar (DE); Julia Roberti, Wetzlar (DE); Giulia Ossato, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 290 days.

(21) Appl. No.: 18/586,622

(22) Filed: Feb. 26, 2024

(65) Prior Publication Data

US 2024/0290117 A1     Aug. 29, 2024

(30) Foreign Application Priority Data

Feb. 28, 2023    (EP) .................................... 23159128

(51) Int. Cl.
*G06K 9/00*        (2022.01)
*G01N 21/64*       (2006.01)
(Continued)

(52) U.S. Cl.
CPC ....... *G06V 20/698* (2022.01); *G01N 21/6408* (2013.01); *G01N 21/6458* (2013.01);
(Continued)

(58) Field of Classification Search
CPC .... G06V 20/698; G06V 10/25; G06V 20/695; G06V 20/693; G06V 10/764;
(Continued)

(56) References Cited

U.S. PATENT DOCUMENTS

2018/0321154 A1*  11/2018  Podgorski .......... G02B 21/0032
2023/0034263 A1*   2/2023  Zhao ..................... C12Q 1/682
(Continued)

OTHER PUBLICATIONS

Vallmitjana, Alex, Belén Torrado, and Enrico Gratton. "Phasor-based image segmentation: machine learning clustering techniques." Biomedical optics express 12.6 (2021): 3410-3422. (Year: 2021).*

(Continued)

*Primary Examiner* — Avinash Yentrapati
(74) *Attorney, Agent, or Firm* — LEYDIG, VOIT & MAYER, LTD.

(57)        ABSTRACT

A processor for lifetime-based unmixing in fluorescence microscopy is configured to acquire an image having a plurality of pixels, each pixel providing information on photon count and photon arrival times, generate a phasor plot that is a vector space representation of the image, partition the image into image segments, evaluate the image segments according to total photon counts of the corresponding subsets of pixels, and execute a lifetime classification by selecting an image segment having a largest total photon count, determining a region of interest in the image encompassing the image segment, determining a phasor subset in the phasor plot corresponding to the region of interest, and generating a lifetime class including a set of image segments corresponding to the phasor subset. A plurality of lifetime classes is generated by iteratively executing the lifetime classification. The processor is configured to perform lifetime-based unmixing using the lifetime classes.

11 Claims, 7 Drawing Sheets

(51) Int. Cl.
*G06V 10/25* (2022.01)
*G06V 20/69* (2022.01)

(52) U.S. Cl.
CPC ............ *G06V 10/25* (2022.01); *G06V 20/693* (2022.01); *G06V 20/695* (2022.01)

(58) Field of Classification Search
CPC .............. G06V 10/26; G01N 21/6408; G01N 21/6458; G06T 1/20
See application file for complete search history.

(56) References Cited

U.S. PATENT DOCUMENTS

2024/0201088 A1* 6/2024 Ghorbani ........... G01N 21/6458
2024/0412338 A1* 12/2024 Chiang ................. G01J 3/2823

OTHER PUBLICATIONS

Zhang, Yide, et al. "Automatic segmentation of intravital fluorescence microscopy images by K-means clustering of FLIM phasors." Optics Letters 44.16 (2019): 3928-3931. (Year: 2019).*
Digman, Michelle A et al.; "The Phasor Approach to Fluorescence Lifetime Imaging Analysis"; *Biophysical Journal—Biophysical Letters*; Jan. 15, 2008; pp. L14-L16; vol. 94, No. 2; ScienceDirect, Elsevier; Amsterdam, The Netherlands.
Vallmitjana, Alex et al.; "Phasor-Based Image Segmentation: Machine Learning Clustering Techniques"; *Biomedical Optics Express*; May 17, 2021; pp. 3410-3422; vol. 12, No. 6/1; XP093065899; Optica; Washington, D.C., USA.
Zhang, Yide et al.; "Automatic Segmentation of Intravital Fluorescence Microscopy Images by K-Means Clustering of FLIM Phasors"; Optics Letters; Aug. 6, 2019; pp. 3928-3931; vol. 44, No. 16; XP093066083; Optica; Washington, D.C., USA.

* cited by examiner

100
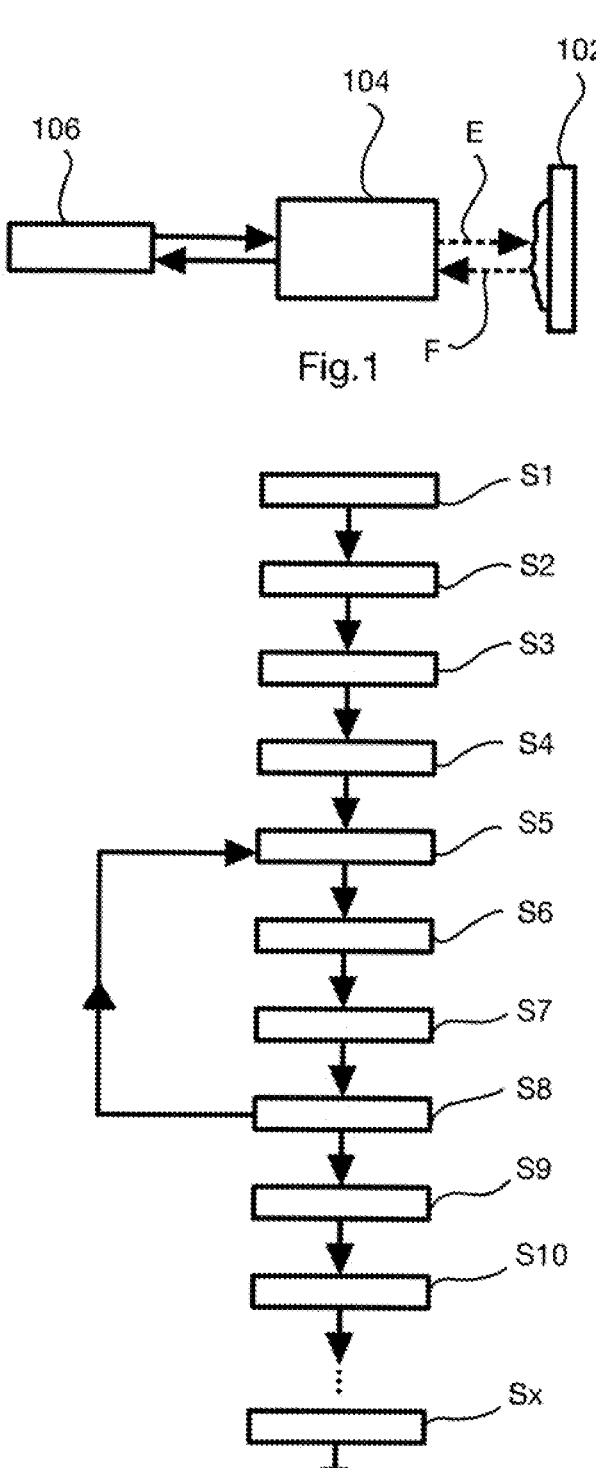
Fig. 1
Fig. 2

| image segment | total intensity | G; S | AAT variance | lifetime class |
|---|---|---|---|---|
| segment 1 | I_max | G1; S1 | V_min | class 1 |
| segment 2 | I_max-1 | G2; S2 | V_min-1 | ? |
| ⋮ | ⋮ | ⋮ | ⋮ | ⋮ |

Table 1

PROCESSOR FOR LIFETIME-BASED UNMIXING IN FLUORESCENCE MICROSCOPY

CROSS REFERENCE TO RELATED APPLICATIONS

This application claims benefit to European Patent Application No. 23159128.0, filed on Feb. 28, 2023, which is hereby incorporated by reference herein.

FIELD

Embodiments of the present invention relate to a processor for lifetime-based unmixing in fluorescence microscopy. Embodiments of the invention also relate to a microscope system including a processor, a method for lifetime-based unmixing in fluorescence microscopy, and a computer program.

BACKGROUND

In fluorescence microscopy, a variety of fluorescent dyes are available allowing to capture multicolor images in multiple color channels. However, in case of spectral overlap occurs, significant crosstalk or bleed-through may occur, meaning that emission signals from multiple fluorophores are detected in each color channel. Thus, interpreting multicolor images may be challenging because each image consists of a mixture of emission signals from multiple fluorophores.

Fluorescence-lifetime imaging microscopy (FLIM) is a specific imaging technique which can be used to identify a fluorophore in a sample by determining a decay rate of photons emitted by the fluorophore. In a FLIM image, an intensity of each pixel is determined by the fluorescence lifetime which can be acquired in the time domain by using e.g. a pulsed excitation light source. Time-correlated single-photon counting (TCSPC) is usually employed to record a fluorescence decay histogram providing information on both photon count and photon arrival time for each pixel. Fluorescence-lifetime imaging can be used as an imaging technique e.g. in confocal microscopy and two-photon excitation microscopy.

In fluorescence-lifetime imaging, a phasor approach is a well-established method for data visualization and image analysis as described e.g. in Vallmitjana et al., "Phasor-based image segmentation: machine learning clustering techniques", Biomedical Optics Express, Vol. 12, No. 6/1 (2021), 3410-3422. A phasor transform that is applied to a histogram representing photon counts as a function of arrival times yields two quantities which are mapped to a two-dimensional space called phasor space.

Spectral fluorescence-lifetime imaging allows temporal fluorescence emission decays to be simultaneously acquired in a spectrally resolved manner. For a quantitative analysis, however, spectral overlap between the different fluorophores needs to be considered. This can be achieved either by spectral unmixing or lifetime-based unmixing.

However, lifetime-based unmixing requires extensive a priori knowledge. Such knowledge is not limited to information about the specific lifetime behavior of the fluorophores. Rather, it includes, more generally, information or expectation about the behavior of fluorophores in a sample. Furthermore, in certain samples such as model organisms, endogenous signals can also contribute significantly to complexity. Attempting to determine the fluorophore species present in a specific spectral channel based on lifetimes is therefore often compared to looking for a needle in a haystack.

It may be possible to have information about the average fluorescence lifetime, meaning the overall contributions from all species. In cases where only two distinct mono-exponential lifetimes are present, this can be inferred from fitting approaches. However, when more than two fluorophores are present, or when the fluorophores exhibit significant multi-exponential behavior, fitting approaches are no longer effective.

A conventional phasor approach cannot be readily used because a phasor plot shows the overall contributions of all species to an image. This results in users having to empirically look at all positions on a phasor plot to find the lifetime position that correspond to a structure they want to see. Such an approach is not easily reproducible. It is also biased by the users and cannot be automated.

There are efforts to apply artificial intelligence (AI) and machine learning (ML) to lifetime data to try to learn how many components can be found. However, these efforts require a particular training and are not immediately applicable to any given sample.

SUMMARY

Embodiments of the present invention provide a processor for lifetime-based unmixing in fluorescence microscopy. The processor is configured to acquire an image having a plurality of pixels, each pixel providing information on both photon count and photon arrival times, generate a phasor plot, the phasor plot being a vector space representation of the image, partition the image into multiple image segments, each image segment including a subset of the plurality of pixels, evaluate the multiple image segments according to total photon counts of the corresponding subsets of pixels, and execute a lifetime classification by selecting from the multiple image segments an image segment evaluated to have a largest total photon count, determining a region of interest in the image encompassing the image segment, determining a phasor subset in the phasor plot corresponding to the region of interest, and generating a lifetime class including the set of image segments corresponding to the phasor subset. The processor is configured to generate a plurality of disjunct lifetime classes by iteratively executing the lifetime classification based on remaining image segments not assigned to one of the preceding lifetime classes, and to perform lifetime-based unmixing using the disjunct life-time classes.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 is a block diagram of a microscope system including a processor for lifetime-based unmixing according to an embodiment;

FIG. 2 is a flow diagram showing a method performed by the processor for lifetime-based unmixing according to an embodiment;

DETAILED DESCRIPTION

Figure 3:
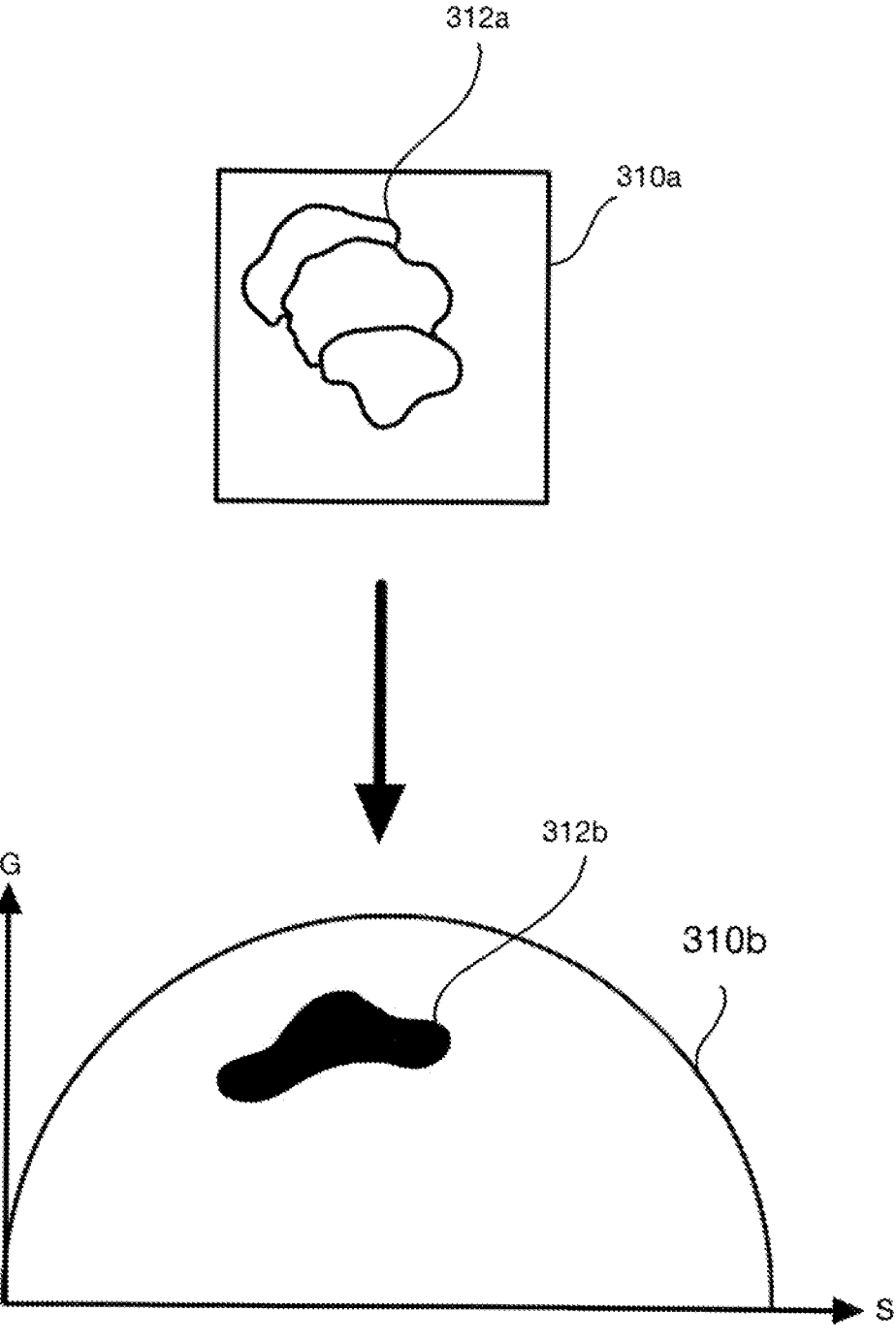
FIG. 3 is schematic diagram illustrating an image and a corresponding phasor plot according to some embodiments.

Embodiments of the present invention provide a processor that enables reliable and straightforward lifetime-based unmixing in fluorescence microscopy.

A processor for lifetime-based unmixing in fluorescence microscopy is configured to acquire an image having a plurality of pixels, each pixel providing information on both photon count and photon arrival times. The processor is configured to generate a phasor plot which is a vector space representation of the image. The processor is configured to partition the image into multiple image segments, each image segment including a subset from the plurality of pixels. The processor is configured to evaluate the image segments according to total photon counts of the corresponding subsets of pixels. The processor is further configured to execute a lifetime classification, wherein the lifetime classification comprising a step of selecting from the image segments an image segment evaluated with the largest total photon count; a step of determining a region of interest in the image encompassing the image segment; a step of determining a phasor subset in the phasor plot corresponding to the region of interest; and a step of generating a lifetime class including those image segments consistent with the phasor subset. The processor is configured to generate a plurality of disjunct lifetime classes by iteratively executing the lifetime classification based on the remaining image segments not assigned to one of the preceding lifetime classes and to perform lifetime-based using the disjunct lifetime classes.

The claimed solution is based on the knowledge that individual pixels of an image usually do not contain enough information to describe a particular fluorescence lifetime. Therefore, an image acquired in a particular spectral range and carrying both fluorescence intensity and arrival time information is used as a starting point.

The processor is configured to reduce the amount of data provided by an image that is used for identifying individual signal contributions originating from multiple fluorophores.

For this purpose, the processor detects different fluorescence lifetime classes or clusters based on the fluorophore behavior present in the image. The processor enables the lifetime classes to be detected or determined in an automated manner. It might helpful for a user to provide at least one user input to enable or initiate the automated lifetime classes detection. Such an automated detection of fluorescence lifetime classes enables fluorophore unmixing including exogenous and/or endogenous signals from a sample.

The segmentation executed by the processor serves to create multiple image segments, each segment including a subset of pixels. The granularity of the segmentation is preferably selected such that the number of pixels in each segment is, on the one hand, small enough to obtain pixel-precise resolution, and, on the other, large enough to provide sufficient amount of information.

It should be emphasized that the proposed solution does not require a priori knowledge about the sample.

In a preferred embodiment, the processor is configured to determine whether the determined phasor subset corresponding to the region of interest defines a unique position in the phasor plot. In this case, the processor is further configured to newly create the lifetime class if the determined phasor subset corresponds to the unique position and to refrain from newly creating the lifetime class if the determined phasor subset does not correspond to the unique position.

Preferably, the processor is configured to determine an average arrival time for each pixel, the average arrival time representing information on the photon arrival time. The average arrival time (AAT) is a characteristic quantity for each fluorophore which can be calculated fast and easily. In particular, the average arrival time can be used to effectively determine the geometry of segmentation. A beneficial side effect is that the average arrival time may vary depending on the environment of the fluorophore, providing a useful parameter for analyzing the microenvironment of the fluorophore.

The processor may be configured to calculate a minimum variance of the average arrival time for each image segment and to determine the region of interest encompassing each image segment based on the minimum variance of the average arrival time. Thus, the region of interest may be considered as an image portion which is centered at the respective image segment and whose spatial extent is determined by the AAT variance.

Preferably, the processor is configured to remove background from the image prior to performing lifetime-based unmixing. Thus, lifetime-based unmixing becomes more precise.

In a preferred embodiment, the processor is configured to apply a minimum total photon count as criterion of segmentation. As a result, shape and size of the image segments are allowed to vary in order to ensure a sufficient photon count in each segment. A simpler concept is to use a regular grid pattern for segmentation so that the segments have the same size and shape.

Preferably, the processor is configured to display a spatial distribution of the disjunct lifetime classes, e.g. on a display device like a monitor to the user. Thus, channels can be provided which are unmixed in terms of fluorescence lifetime.

According to another aspect, a microscope is provided which comprises a processor as described above.

According to another aspect, a method or lifetime-based unmixing in fluorescence microscopy is provided. The method comprises the following steps: acquiring an image having a plurality of pixels, each pixel providing information on both photon count and photon arrival times; generating a phasor plot which is a vector space representation of the image; partitioning the image into multiple image segments, each image segment including a subset from the plurality of pixels; evaluating the image segments according to total photon counts of the corresponding subsets of pixels; and executing a lifetime classification. The lifetime classification comprises a step of selecting from the image segments an image segment evaluated with the largest total photon count; a step of determining a region of interest in the image encompassing the image segment; a step of determining a phasor subset in the phasor plot corresponding to the region of interest; and a step of generating a lifetime class including those image segments consistent with the phasor subset. A plurality of disjunct lifetime classes is generated by iteratively executing the lifetime classification based on the remaining image segments not assigned to one of the preceding lifetime classes, and lifetime-based unmixing is performed using the disjunct life-time classes.

Furthermore, a computer program with a program code for performing the method described above is provided.

FIG. 1 is a block diagram showing a microscope system 100 according to an embodiment.

The microscope system 100 may be configured as a point-scanning microscope that acquires images of a sample 102 which includes multiple fluorophores of different species emitting fluorescence light of different colors. More specifically, the microscope 100 may be adapted to perform fluorescence-lifetime imaging (FLIM) which can be applied to identify distinct fluorophores by determining decay rates of fluorescence photons emitted by the respective fluorophores.

For this purpose, the microscope system 100 may be equipped with suitable microscope components known in the art and generally referred to as block 104 in FIG. 1. Although not specifically shown in FIG. 1, the components 104 may include one or more pulsed-laser excitation sources that emit excitation light E and an optical system that directs the excitation light E onto the sample 102 and collects fluorescence light F therefrom. Furthermore, the components 104 may include one or more detectors which are configured for pixel-by-pixel imaging in multiple color channels. In addition, the detectors may be capable of generating lifetime-based information e.g. by time-correlated single-photon counting (TCSPC). Accordingly, it may be possible to record a fluorescence decay histogram providing information on both photon count and photon arrival times for each pixel in a specific color channel. Furthermore, the microscope system 100 may include a monitor on which a microscope image is displayed.

The microscope system 100 further comprises a processor 106 that may be used to control an overall operation of the microscope system 100. In particular, the processor 106 is configured to execute a process for lifetime-based unmixing as described hereinafter.

FIG. 2 is a flow diagram showing an embodiment of a method that may be executed under the control of the processor 106 to perform lifetime-based unmixing of image signals which are acquired by means of the microscope system 100. Hereinafter, an exemplary sequence of methods steps is explained with reference to FIGS. 3 to 9 in which these steps are illustrated.

In step S1 of the exemplary method, an image 310a of the sample 102 consisting of a plurality of pixels is acquired by the microscope system 100 as shown in FIG. 3. The image 102 may first be assessed for background by the processor

6

106. Thus, the processor 106 selects only those pixels of the image 10 for further processing which do not represent background. According to the example shown in FIG. 3, those pixels selected to be further processed are assumed to form a target image 312a.

Each pixel of the target image 312a provides intensity information in form of a photon count. In addition, for each pixel of the target image 312a information on the photon arrival time such as TCSPC information is acquired. As a result, each pixel is associated with information on both photon count and photon arrival times.

More specifically, in step S1, an average arrival time may be calculated for each pixel according to the following relation:

$$AAT = \frac{\sum_{i=1}^{N} AT_i}{N}$$

Therein, AAT denotes the average arrival time, $AT_i$ denotes an arrival time of photon i, and N designates a total number of photons detected during a pixel well time of the microscope which might be a raster scanning microscope. Furthermore, in step S1, a photon histogram may be obtained for each pixel based on the TCSPC information.

Subsequently, in step S2, a vector space representation of the image 310a is generated in form a phasor plot 310b shown in FIG. 3. At each selected pixel, a phasor transform is applied to a photon histogram distribution I(t) representing the photon counts as a function of the arrival times detected by means of TCSPC. As a result, two phasor quantities S and G are obtained in accordance with the following relations as discloses e.g. in Digman M. A. et al., "The Phasor Approach to Fluorescence Lifetime Imaging Analysis" Biophysical Journal: Biophysical Letters (2007), L14-L16:

$$S = \frac{\int_0^\infty I(t)\sin(\omega nt)dt}{\int_0^\infty I(t)dt}$$

$$G = \frac{\int_0^\infty I(t)\cos(\omega nt)dt}{\int_0^\infty I(t)dt}$$

The phasor quantities S and G are mapped into the phasor space as shown in FIG. 3. Accordingly, the target image 312a is transformed into a phasor region 312b representing all lifetime contributions that originate from the target image 312b.

In step S3, the target image 312a is partitioned by the processor 106 into a plurality of image segments representing a spatial distribution of pixel signals. A granularity of the segmentation, i.e. the size of each segment represented by a subset of pixels, may be determined based on the total number of photons detected by this subset of pixels during the pixel dwell time. For example, the segment size may be determined such that all pixels of a single segment have a minimum total number of photons such as e.g. at least 30 photons.

Figure 4A:
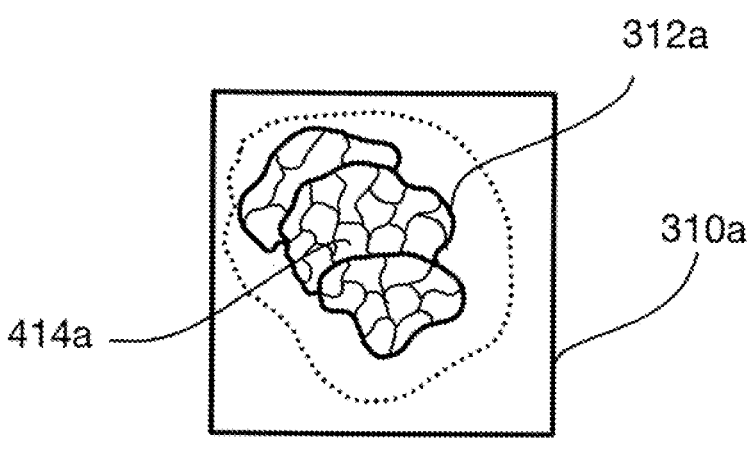
FIG. 4*a* is schematic diagram illustrating an example for a segmentation of the image according to some embodiments.
Figure 4B:
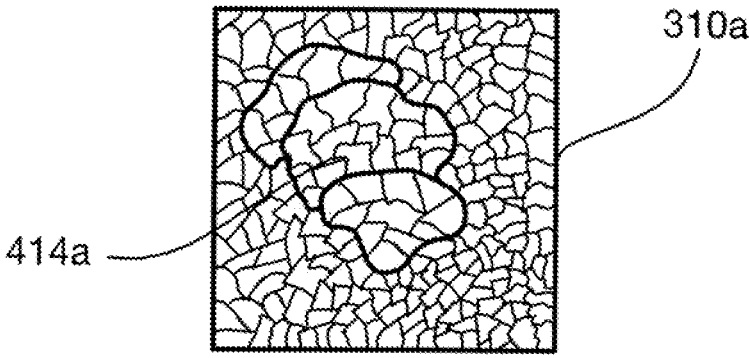
FIG. 4*b* is schematic diagram illustrating another example for a segmentation of the image according to some embodiments.
Figure 4C:
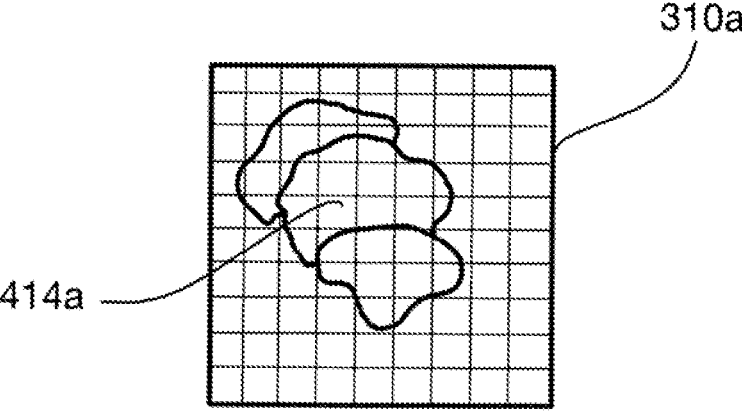
FIG. 4*c* is schematic diagram illustrating another example for a segmentation of the image according to some embodiments.

The segmentation in step S3 may be performed by the processor 106 applying an appropriate segmentation algorithm, including machine learning (ML) or artificial intelligence (AI), while only the target image 312a is segmented and the rest of the image 310*a* is disregarded. This is shown in FIG. 4*a* where a single segment is indicated by reference sign 414*a* representative for all segments. The processor 106 may also be configured to apply an appropriate fragmentation to the entire image 310*a*, as shown in FIG. 4*b*, where a minimum total photon count is applied as criterion for segmentation, resulting in segments of different sizes. According to a simpler approach, the processor 106 applies a regular grid pattern for segmentation so that all segments have the same size and shape as shown in FIG. 4*c*.

In step S4, the processor 106 evaluates the different image segments according to the total photon counts detected in the subset of pixels that is included in each segment 414*a*. For this evaluation and all subsequent steps, the target image 312*a* is used without any thresholding. For example, the processor 106 may create a table as shown in FIG. 5 (referred to herein as Table 1).

Figures 5, 6:
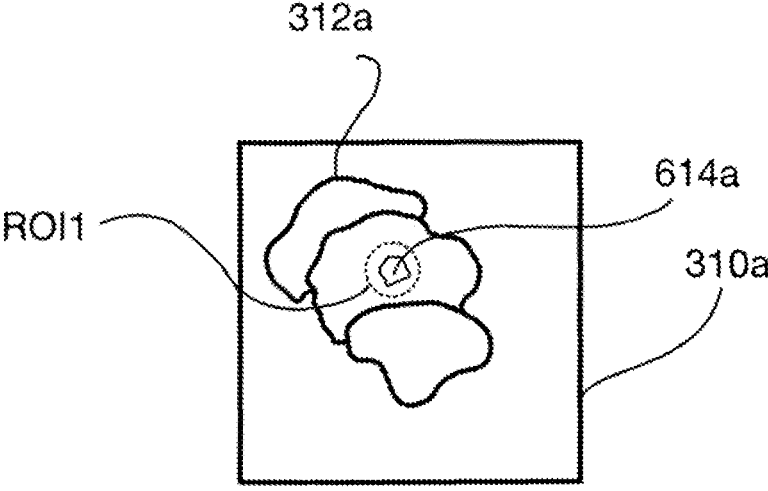
FIG. 5 is table including specific quantities for each image segment determined by the processor, according to some embodiments.
FIG. 6 is a schematic diagram showing a region of interest in the image, according to some embodiments.

Table 1 of FIG. 5 is created by determining the total intensities I_max, I_max−1, . . . , i.e. the total photons, for all segments, wherein I_max denotes the largest photon count, I_max−1 denotes the second largest the largest photon count, and so forth. In other words, in Table 1, the segments are sorted from top to bottom in order of their total the photon counts, i.e. segment 1 has the largest total photon count, segment 2 has the second largest photon count, and so forth. The processor 106 further calculates the phasor quantities G and S for all segments. In Table 1, G1 and S1 belongs to segment 1, G2 and S2 belongs to segment 2, and so forth.

In addition, the processor 106 calculates in step S4 a variance of the average arrival time (AAT) for each segment in accordance with the following relation:

$$V^2 = \frac{\sum (AAT_i - \overline{AAT})^2}{n-1}$$

$V^2$=sample variance
$AAT_i$=the AAT at pixel i
$\overline{AAT}$=the mean AAT value of all observations
n=the number of observations/pixels The variance as calculated above may be used as a further criterion for sorting the segments in the table of FIG. 5. In this example, it is assumed that segment 1 having the largest total photon count I_max has a minimum variance denoted V_min, segment 2 having the second largest total photon count I_max−2 has the second lowest variance denoted V_min−1, and so forth. In case that two segments have the same intensity, this further sorting criterion determines that the one with the smaller variance will be considered first.

In step S5, the processor 106 selects a segment with the largest total photon count. Thus, when step S5 is executed for the first time, segment 1 with photon count I_max is selected from Table 1.

Subsequently, in step S6, the segment selected in step S5 is considered to be a potential seeding point 614*a* based on which the processor 106 determines a region of interest ROI1 within the target image 312*a*, as illustrated in FIG. 6. For example, the processor 106 creates the region of interest ROI1 starting from the seeding point 614*a* as a center and expanding an image portion therefrom by a value that corresponds to the AAT variance V_min indicted in the table of FIG. 5. Thus, ROI1 represents an image portion which is centered at the seeding point 614*a*, i.e. segment 1, and whose radial extent is capped based on the AAT variance V_min.

Figure 7:
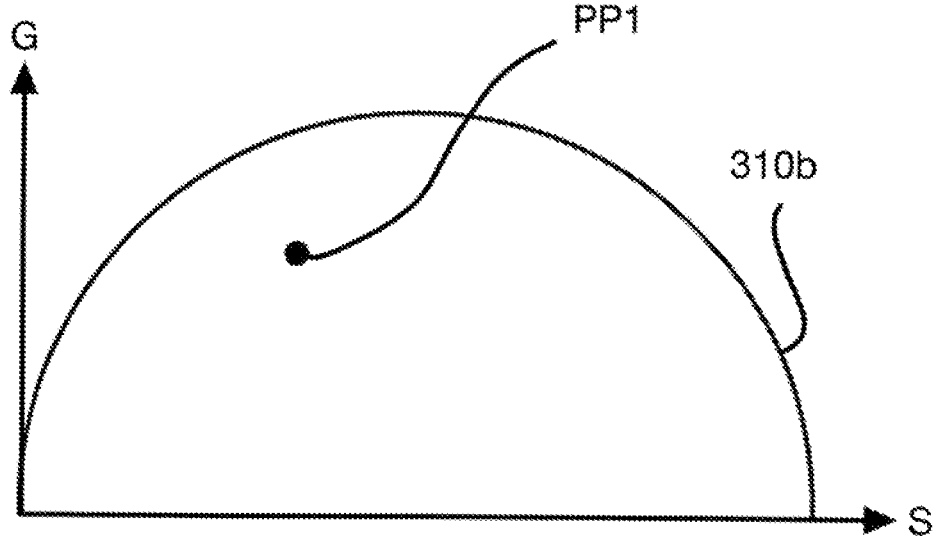
FIG. 7 is a schematic diagram showing a phasor plot which includes a first phasor subset, according to some embodiments.

In step S7, the processor 106 calculates a phasor transform based the region of interest ROI1 shown in FIG. 7. As result, a phasor subset PP1 corresponding to the region of interest ROI1 is generated.

Then, in step S8, the processor 106 checks whether the phasor subset PP1 defines a unique position in the phasor plot 310*b*, i.e. whether it represents a well-defined phasor position determined by a specific pair of phasor quantities (S; G) in FIG. 7.

If the processor 106 determines in step S8 that the phasor subset PP1 does not represent a well-defined position in the phasor plot 310*b*, the processor 106 returns to step S5 and selects the segment with the next larger photon count from Table 1. For example, if segment 1 with total photon count I_max was previously selected from Table 1, segment 2 with photon count I_max−1 is now selected. Steps S6 to S8 are then repeated with the next larger total count.

The loop of steps S5 to S8 is repeated until one of segments listed in Table 1 is found to yield a well-defined phasor position in the phasor plot 310*b* as shown in FIG. 7.

Figure 8:
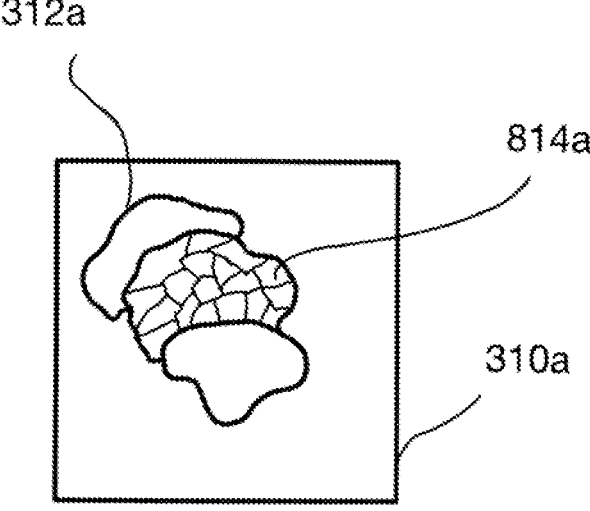
FIG. 8 is a schematic diagram showing multiple segments of the image which are assigned to a lifetime class, according to some embodiments.

Subsequently, in step S9, the processor selects the phasor subset PP1 as a starting point for lifetime classification. This is possible since the phasor subset PP1 was identified before as a well-defined unique phasor position derived from a portion of the image 310*a* that is limited to ROI1. In particular, the processor 106 determines all portions of the target image 312*a* that exhibit a lifetime behavior which is consistent with the phasor subset PP1. In doing so, the processor 106 may also cause these consistent image portions to be displayed on a monitor. This is illustrated in FIG. 8 with the consistent image portions denoted by reference sign 814*a*. The phasor subset PP1 calculated in step S7 represents a first phasor position based on which a first lifetime class ("class 1" in FIG. 5) is newly created.

More specifically, in step S9, the processor 106 searches among the segments listed in Table 1 of FIG. 5 for segments with fluorescence lifetimes that match the first lifetime class. Those segments are then classified as belonging to the first lifetime class. Whether a particular segment listed in Table 1 has a fluorescence lifetime corresponding to the first lifetime class can be quantitatively determined from the phasor quantities S and G assigned to that segment. For example, the processor 106 may determine whether the phasor quantities S and G of a particular segment are within a predetermined tolerance range around the first phasor position which is represented by the phasor subset PP1 in the phasor plot 310*b* of FIG. 7.

In steps S5 to S9, the processor 106 performs a lifetime classification resulting in the afore-mentioned first lifetime class. The remaining segments of Table 1 that have not been assigned to the first lifetime class can now be processed by iteratively executing the lifetime classification in the same manner as described above.

Thus, after the first lifetime class has been generated, the processor 106 creates in step S10 a new (second) table similar to Table 1 of FIG. 5. However, the second table includes only the remaining segments from Table 1 that have not been classified before as belonging to the first lifetime class. Accordingly, the processor 106 now selects a segment which has the largest total photon count among the remaining segments that are listed in the second table. Then, the processor 106 substantially repeats steps S5 to S9, using the second table rather than Table 1.

As result, the processor 106 executes a second round of lifetime classification yielding a second lifetime class disjunct from the first lifetime class.

Figure 9:
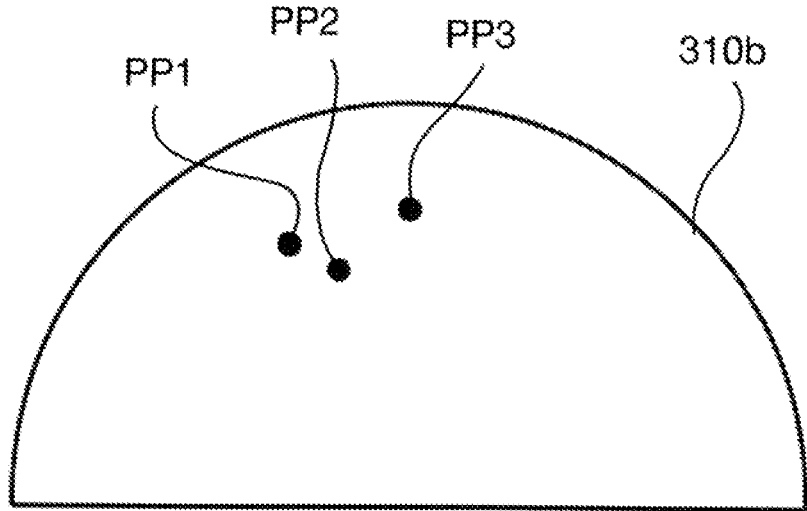
FIG. 9 is a schematic diagram showing a phasor plot which additional phasor subset, according to some embodiments.

The processor 106 may proceed in the same manner to generate additional (third, fourth, etc.) lifetime classes. For instance, a third lifetime class may be created based on a third table including all remaining segments of Table 1 that have not been classified before as belonging to the preceding (first and second) lifetime classes. FIG. 9 illustrates the phasor plot 310$b$ for the case where a total of three lifetime classes are considered. In this case, two further phasor subsets PP2 and PP3 are plotted in addition the first phasor subset PP1.

This iterative classification process described above may continue until an nth lifetime class has been created based on an nth table. If no new well-defined phasor position can be found, it is assumed that all well-defined phasor positions and the corresponding lifetime classes which can be derived from the data have eventually been found. Such a final classification step is denoted Sx in the flow diagram of FIG. 2.

As result, applying common phasor algebra as known in the art, the lifetime classes can be used in step Sx+1 to generate corresponding channels that are unmixed in terms of lifetime and display the spatial distribution of the lifetime classes found in the image.

It is to be noted that the sequence of steps described above is to be understood merely as an example. In particular, not all of the steps explained above need to be performed to implement the proposed solution. For example, the background assessment in step S1 may also be omitted, in which case not only the target image 312$a$ but the entire image 312$a$ is processed as explained above.

It is further to be noted that the process described above refers to a simple example in which the image data to be processed represents a single two-dimensional image. However, if e.g. an image sequence such as a z-stack is recorded at time intervals, it may be appropriate to segment the image data spatially, i.e. in 3D, as well as temporally in order to process the complete data set. In this context, it should be noted that in multidimensional imaging varying both spatially and temporally, it may be appropriate to reduce the amount of image data so that the region of interests described above belong to a single plane in space and time, i.e. a single xyzt-plane.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Figure 10:
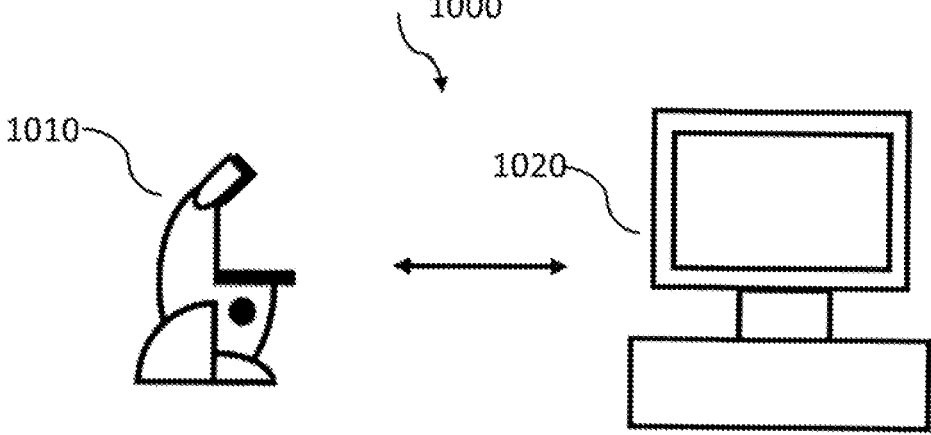
FIG. 10 shows a schematic illustration of a system to perform the method, according to some embodiments.

Some embodiments relate to a microscope comprising a system as described in connection with one or more of the FIGS. 1 to 9. Alternatively, a microscope may be part of or connected to a system as described in connection with one or more of the FIGS. 1 to 9. FIG. 10 shows a schematic illustration of a system 1000 configured to perform a method described herein. The system 1000 comprises a microscope 1010 and a computer system 1020. The microscope 1010 is configured to take images and is connected to the computer system 1020. The computer system 1020 is configured to execute at least a part of a method described herein. The computer system 1020 may be configured to execute a machine learning algorithm. The computer system 1020 and microscope 1010 may be separate entities but can also be integrated together in one common housing. The computer system 1020 may be part of a central processing system of the microscope 1010 and/or the computer system 1020 may be part of a subcomponent of the microscope 1010, such as a sensor, an actor, a camera or an illumination unit, etc. of the microscope 1010.

The computer system 1020 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 1020 may comprise any circuit or combination of circuits. In one embodiment, the computer system 1020 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 1020 may be a custom circuit, an application-specific integrated circuit (ASiC), or the like, such as, for example, one or more circuits (such as a communication circuit) for use in wireless devices like mobile telephones, tablet computers, laptop computers, two-way radios, and similar electronic systems. The computer system 1020 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 1020 may also include a display device, one or more speakers, and a keyboard and/or controller, which can include a mouse, trackball, touch screen, voice-recognition device, or any other device that permits a system user to input information into and receive information from the computer system 1020.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 microscope system
102 sample
104 microscope components
106 processor
310*a* image
310*b* phasor plot
312*a* target image
312*b* phasor region
414*a* image segment
614*a* potential seeding point
814*a* image portion
ROI1 region of interest
PP1, PP2, PP3 phasor subset

The invention claimed is:

1. A processor for lifetime-based unmixing in fluorescence microscopy, the processor being configured to:
   acquire an image having a plurality of pixels, each pixel providing information on both photon count and photon arrival times,
   generate a phasor plot, the phasor plot being a vector space representation of the image,
   partition the image into multiple image segments, each image segment including a subset of the plurality of pixels,
   evaluate the multiple image segments according to total photon counts of the corresponding subsets of pixels, and
   execute a lifetime classification by:
      selecting from the multiple image segments an image segment evaluated to have a largest total photon count,
      determining a region of interest in the image encompassing the image segment,
      determining a phasor subset in the phasor plot corresponding to the region of interest, and
      generating a lifetime class including a set of image segments corresponding to the phasor subset,
   wherein the processor is configured to generate a plurality of disjunct lifetime classes by iteratively executing the lifetime classification based on remaining image segments not assigned to one of the preceding lifetime classes, and to perform lifetime-based unmixing using the disjunct life-time classes.

2. The processor according to claim 1, wherein the processor is configured to:
   determine whether the phasor subset corresponding to the region of interest defines a unique position in the phasor plot,
   create a new lifetime class upon determining that phasor subset corresponds to the unique position, and to refrain from creating the new lifetime class upon determining that the phasor subset does not correspond to the unique position.

3. The processor according to claim 1, wherein the processor is configured to calculate an average arrival time for each pixel, the average arrival time representing information on the photon arrival times.

4. The processor according to claim 3, wherein the processor is configured to calculate a minimum variance of the average arrival time for each image segment, and determine the region of interest encompassing each image segment based on the minimum variance of the average arrival time.

5. The processor according to claim 1, wherein the processor is configured to display a spatial distribution of the disjunct lifetime classes.

6. The processor according to claim 1, wherein a granularity of the partitioning into the multiple image segments is determined based on a total number of photons detected by the subset of pixels during a pixel dwell time.

7. The processor according to claim 1, wherein the image comprises at least one of a single two-dimensional image, an image sequence, or a three-dimensional image.

8. The processor according to claim 1, wherein each image segment comprises at least one of a single two-dimensional image segment, an image segment sequence, or a three-dimensional image segment.

9. A microscope system comprising a processor according to claim 1.

10. A method for lifetime-based unmixing in fluorescence microscopy, the method comprising:

acquiring an image having a plurality of pixels, each pixel providing information on both photon count and photon arrival times, generating a phasor plot, the phasor plot being a vector space representation of the image, partitioning the image into multiple image segments, each image segment including a subset of the plurality of pixels, evaluating the multiple image segments according to total photon counts of the corresponding subsets of pixels, executing a lifetime classification by:

selecting from the multiple image segments an image segment evaluated to have a largest total photon count, determining a region of interest in the image encompassing the image segment, determining a phasor subset in the phasor plot corresponding to the region of interest, and generating a lifetime class including a set of image segments corresponding to the phasor subset, iteratively executing the lifetime classification to generate a plurality of disjunct lifetime classes based on remaining image segments not assigned to one of the preceding lifetime classes, and performing lifetime-based unmixing using the disjunct life-time classes.

11. A non-transitory computer-readable medium having a program code stored thereon, the program code, when executed by a computer processor, causing performance of a method for lifetime-based unmixing in fluorescence microscopy, the method comprising:

acquiring an image having a plurality of pixels, each pixel providing information on both photon count and photon arrival times, generating a phasor plot, the phasor plot being a vector space representation of the image, partitioning the image into multiple image segments, each image segment including a subset of the plurality of pixels, evaluating the multiple image segments according to total photon counts of the corresponding subsets of pixels, executing a lifetime classification by:

selecting from the multiple image segments an image segment evaluated to have a largest total photon count, determining a region of interest in the image encompassing the image segment, determining a phasor subset in the phasor plot corresponding to the region of interest, and generating a lifetime class including a set of image segments corresponding to the phasor subset, iteratively executing the lifetime classification to generate a plurality of disjunct lifetime classes based on remaining image segments not assigned to one of the preceding lifetime classes, and performing lifetime-based unmixing using the disjunct life-time classes.

* * * * *